United States Patent [19]
Wood et al.

[11] Patent Number: 6,029,866
[45] Date of Patent: Feb. 29, 2000

[54] MULTIPLE INJECTION, TOGGLE-ACTION DISPENSING STRUCTURE

[75] Inventors: Christopher J. Wood, Greenfield; Marian Singer, Milwaukee; Walt Witkowski, Lake Geneva, all of Wis.

[73] Assignee: AptarGroup, Inc., Crystal Lake, Ill.

[21] Appl. No.: 09/162,656

[22] Filed: Sep. 29, 1998

[51] Int. Cl.[7] .............................. B67D 3/00; B65D 47/00; B65D 39/00

[52] U.S. Cl. ......................... 222/536; 222/534; 222/556; 215/235; 215/305

[58] Field of Search .................................. 222/534, 536, 222/556; 215/235, 305, 295

[56] References Cited

U.S. PATENT DOCUMENTS

| | | |
|---|---|---|
| 2,241,180 | 5/1941 | Burke . |
| 2,244,565 | 6/1941 | Nast . |
| 3,986,627 | 10/1976 | Zapp ........................................ 215/237 |
| 3,990,598 | 11/1976 | Zapp et al. .............................. 215/272 |
| 4,335,068 | 6/1982 | Hemery . |
| 4,389,385 | 6/1983 | Hendry . |
| 4,416,602 | 11/1983 | Neumeister . |
| 4,440,820 | 4/1984 | Shiho et al. . |
| 4,458,819 | 7/1984 | Geiger ..................................... 215/224 |
| 4,459,256 | 7/1984 | Ziegler . |
| 4,467,931 | 8/1984 | Gach . |
| 4,489,844 | 12/1984 | Breskin . |
| 4,500,218 | 2/1985 | Nishikawa . |
| 4,776,501 | 10/1988 | Ostrowsky .............................. 222/517 |
| 4,789,326 | 12/1988 | Sorensen . |
| 4,808,106 | 2/1989 | Holdt . |
| 5,105,959 | 4/1992 | Kinsley .................................. 215/227 |
| 5,125,916 | 6/1992 | Morita . |
| 5,192,005 | 3/1993 | Zimmerman ........................... 222/148 |
| 5,205,424 | 4/1993 | Gaspar ................................... 215/210 |
| 5,236,107 | 8/1993 | Spaanstra, Sr. . |
| 5,273,177 | 12/1993 | Campbell ............................... 220/281 |
| 5,284,264 | 2/1994 | Gross ...................................... 215/237 |
| 5,289,930 | 3/1994 | Inouye .................................... 215/235 |
| 5,294,385 | 3/1994 | Hirota . |
| 5,314,093 | 5/1994 | Gross et al. . |
| 5,328,058 | 7/1994 | Leoncavallo et al. .................. 222/153 |
| 5,341,960 | 8/1994 | Lay . |
| 5,372,770 | 12/1994 | Machida . |
| 5,439,124 | 8/1995 | Mock . |
| 5,443,172 | 8/1995 | Gabriele ................................. 215/303 |
| 5,482,172 | 1/1996 | Braddock ............................... 215/235 |
| 5,503,303 | 4/1996 | LaWare et al. ..................... 222/153.12 |
| 5,629,029 | 5/1997 | Souder et al. . |
| 5,697,509 | 12/1997 | Hayes . |
| 5,700,500 | 12/1997 | Wilhelm . |
| 5,743,443 | 4/1998 | Hins . |
| 5,950,848 | 9/1999 | Baudin ................................... 222/256 |

FOREIGN PATENT DOCUMENTS 0 570 276 A1   11/1993   European Pat. Off. .

*Primary Examiner*—Kevin Shaver
*Assistant Examiner*—Keats Quinalty
*Attorney, Agent, or Firm*—Rockey, Milnamow & Katz, Ltd.

[57] ABSTRACT

A dispensing structure is provided for an opening to a container. The dispensing structure includes a body for extending from the container around the opening. The dispensing structure defines a discharge aperture communicating with the container opening. An actuator, which defines a pivot axis, is pivotally mounted on the body for occluding flow from the container through the discharge aperture when the actuator is in a closed position and permitting flow from the container when force is applied to the actuator to tilt the actuator to an open position. The actuator includes a first, generally rigid piece which is molded from a material and which defines a force-receiving region on one side of the pivot axis. The actuator includes a second piece which is molded from a material onto the first, rigid, force-receiving region and is bonded to the first, rigid piece to define a finger pad against which a finger may be pressed to tilt the actuator to the open position.

7 Claims, 3 Drawing Sheets

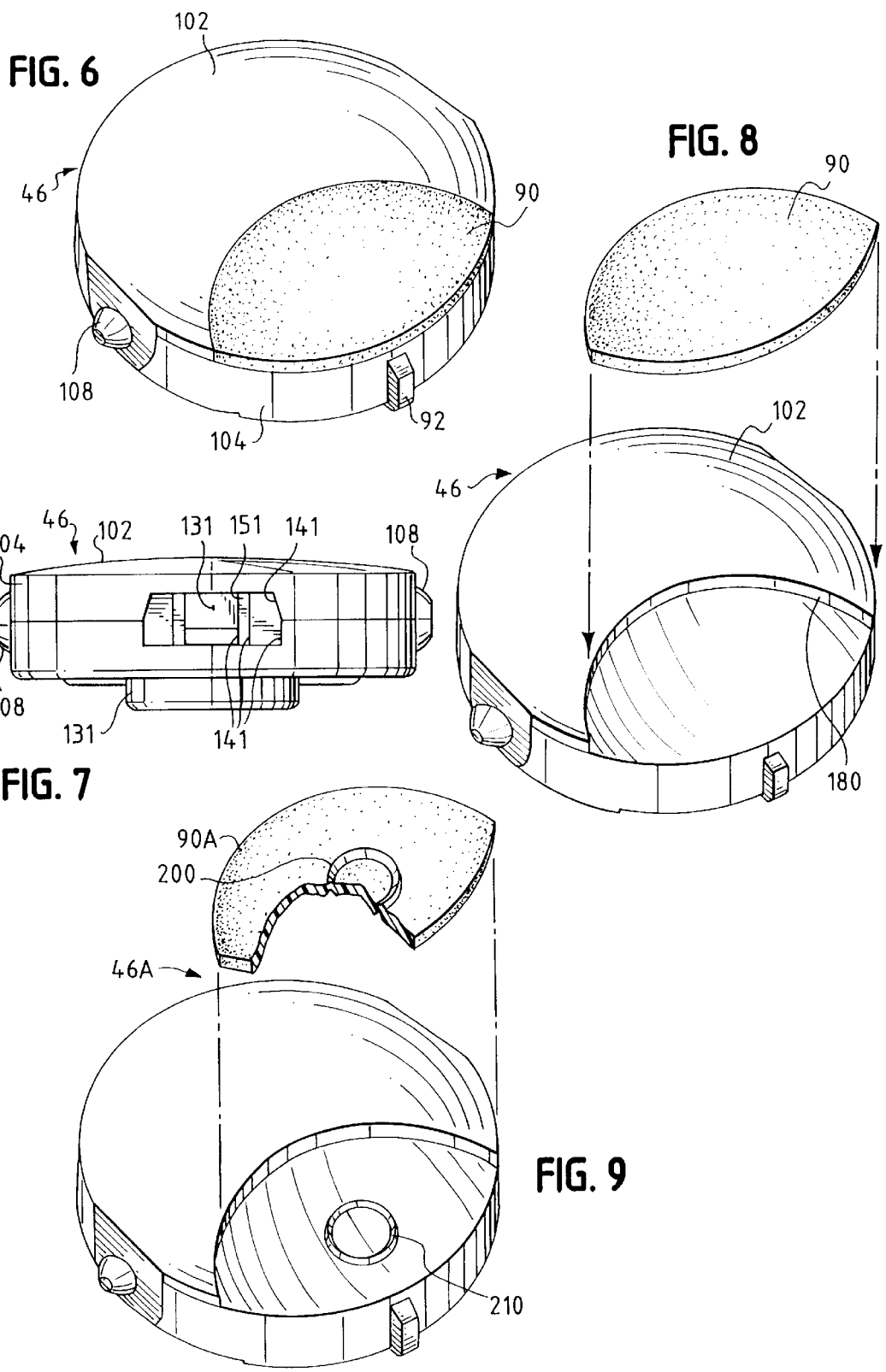

ര6,029,866

MULTIPLE INJECTION, TOGGLE-ACTION DISPENSING STRUCTURE

TECHNICAL FIELD

This invention relates to a system for dispensing a product from a container. The invention is more particularly related to a system incorporating a dispensing structure which has a pivotable actuator in a body over the open end of a container wherein the product can be discharged through the actuator when the actuator is pivoted to an open position and the product is forced from the container when the container is squeezed.

BACKGROUND OF THE INVENTION

AND

TECHNICAL PROBLEMS POSED BY THE PRIOR ART

A variety of packages that include dispensing systems on containers have been developed for household products, personal care products, and other products. It would be desirable to provide an improved dispensing structure for use with such systems.

Designs have been proposed over the years for containers used with flowable substances wherein a closure is provided for being attached to the container mouth and wherein the closure includes a toggle-action actuator incorporating a dispensing channel. Such an actuator is opened by pressing down on a rear portion of a top surface of the actuator so as to tilt the actuator upwardly and then expose the dispensing channel. See, for example, the actuator design disclosed in the U.S. Pat. No. 5,341,960. While such an actuator functions exceptionally well in the applications for which it is intended, it would be desirable to provide an improved actuator which has a means for delineating the region on the actuator which is to be pushed down in order to open the actuator.

Additionally, it would be advantageous if such an improved actuator could incorporate a finger pad against which the end of the user's finger could be pressed for opening the actuator. In some applications, it may be desirable to provide such a finger pad made of material that is softer than the rest of the actuator or which otherwise feels different, or provides a different tactile sensation, than the rest of the actuator.

Further, it would be desirable in some applications to provide an actuator with a finger pad that includes a color, texture, or material that is different from the color, texture, or material in the rest of the actuator.

Such an actuator should be adaptable for use in improved dispensing structures which can accommodate designs that permit incorporation of the dispensing structure as a unitary part, or extension, of the container as well as designs which accommodate the separate mounting of the dispensing structure on the container in a secure manner.

It would also be beneficial if such an improved dispensing structure could readily accommodate its manufacture from a variety of different materials.

Further, it would be desirable if such an improved dispensing structure could be provided with a design that would accommodate efficient, high quality, large volume manufacturing techniques with a reduced product reject rate.

Preferably, the improved dispensing structure should also accommodate high speed manufacturing techniques that produce products having consistent operating characteristics unit-to-unit with high reliability.

The present invention provides an improved dispensing structure which can accommodate designs having the above-discussed benefits and features.

BRIEF SUMMARY OF THE INVENTION

According to one aspect of the present invention, a dispensing structure is provided for a container of flowable material, such as a liquid, cream, or paste, so as to dispense a stream of the material.

The dispensing structure is especially suitable for use on, or as part of, a flexible, squeezable container having an opening to the container interior.

The dispensing structure includes a body for extending from the container around the container opening. The body defines a discharge aperture communicating with the opening.

The dispensing structure includes an actuator which defines a pivot axis and which is pivotally mounted on the body for occluding the flow from the container through the discharge aperture when the actuator is in a closed, non-dispensing position. The actuator permits flow from the container when force is applied to the actuator to tilt the actuator to an open, dispensing position.

The actuator includes a first, rigid piece which is molded from a material and which defines a force-receiving region on one side of the pivot axis.

The actuator includes a second piece which is molded from a material onto the force-receiving region of the first, rigid piece. The second piece is bonded to the first, rigid piece to define a finger pad. The user's finger may be pressed against the finger pad to tilt the actuator to the open, dispensing position.

In a presently preferred embodiment, the second piece which defines the finger pad is molded from a rubber based, thermoplastic elastomer which is softer to the touch than is the material from which the first piece is molded. The second piece may advantageously have a different color than the first piece. Preferably, the first piece is molded from polypropylene and is generally rigid in its after-molded, completed condition.

In a presently contemplated preferred form of the dispensing structure of the present invention is a separate closure which is adapted to be threadingly engaged, or snap-fit engaged, with the container.

Further, it is presently contemplated that a preferred form of making the dispensing closure includes bi-injection molding techniques, although other molding techniques could be employed, such as two-shot molding, multi-injection molding, or over-molding. In general, the actuator of the closure is made by injecting a first material, such as polypropylene, into the vacant cavity of an injection molding tool. During the first injection, part of the cavity is blocked to prevent the melt (e.g., the hot, flowable polypropylene) from filling certain regions of the cavity. The first material is then allowed to cool briefly. Subsequently, the blocking component or components are removed from the molding tool to expose the additional region of the cavity volume. A second injection of thermoplastic material is then effected, typically with a different thermoplastic material than the first material. The second injection of the thermoplastic material fills the remaining, vacant regions of the cavity and bonds to the substrate material of the first injection.

The closure body for receiving the actuator is molded in a separate molding tool, and is typically molded from the same material as the first material of the actuator. However, a different material may be used for the closure body. If desired, the closure body may be provided as an integral or unitary part of the container.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 6 is a top, rear, perspective view of the actuator removed from the closure body;

FIG. 7 is a front, elevation view of the actuator removed from the closure body;

FIG. 8 is an exploded, rear, perspective view of the actuator; and

FIG. 9 is an exploded, rear, perspective view of a second embodiment of the actuator.

DETAILED DESCRIPTION

Figure 1:
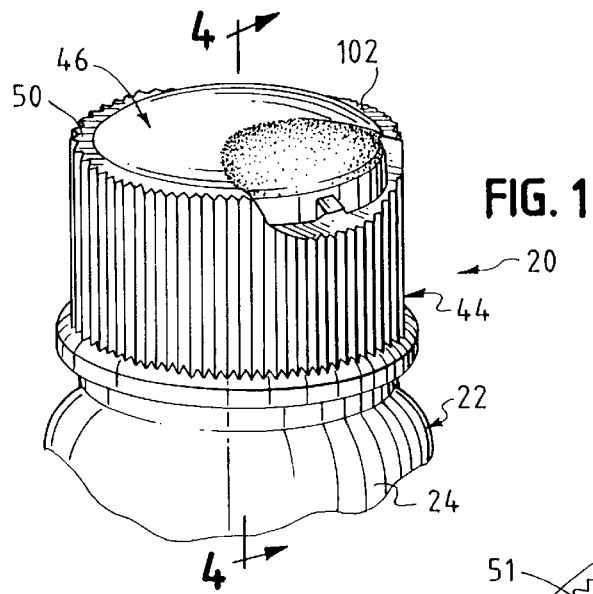
FIG. 1 is a front, perspective, fragmentary view of a first embodiment of the dispensing structure of the present invention in the form of a separate closure on a container and shown with the actuator in the closed position on the closure body.

While this invention is susceptible of embodiment in many different forms, this specification and the accompanying drawings disclose only some specific forms as examples of the invention. The invention is not intended to be limited to the embodiments so described, and the scope of the invention will be pointed out in the appended claims.

For ease of description, the dispensing structure of this invention is described in a typical upright position, and terms such as upper, lower, horizontal, etc., are used with reference to this position. It will be understood, however, that the structure may be manufactured, stored, and used in orientations other than the one described.

A presently preferred, first embodiment of a dispensing structure of the present invention is illustrated in FIGS. 1–8 and is designated generally therein by the reference numeral 20. The dispensing structure is provided in the form of a closure 20 which is adapted to be mounted on a container 22. The body 20 of the container 22 may have any suitable configuration, such as an oval, cross-sectional shape, for example.

Figure 4:
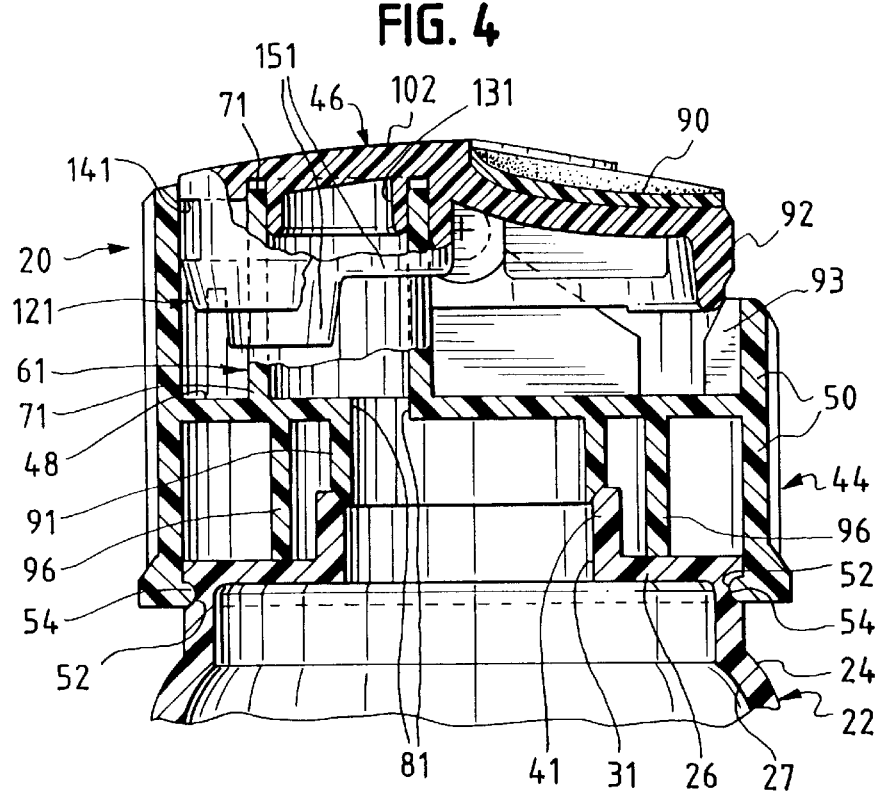
FIG. 4 is a cross-sectional view taken generally along the plane 3—3 in FIG. 1.
Figure 5:
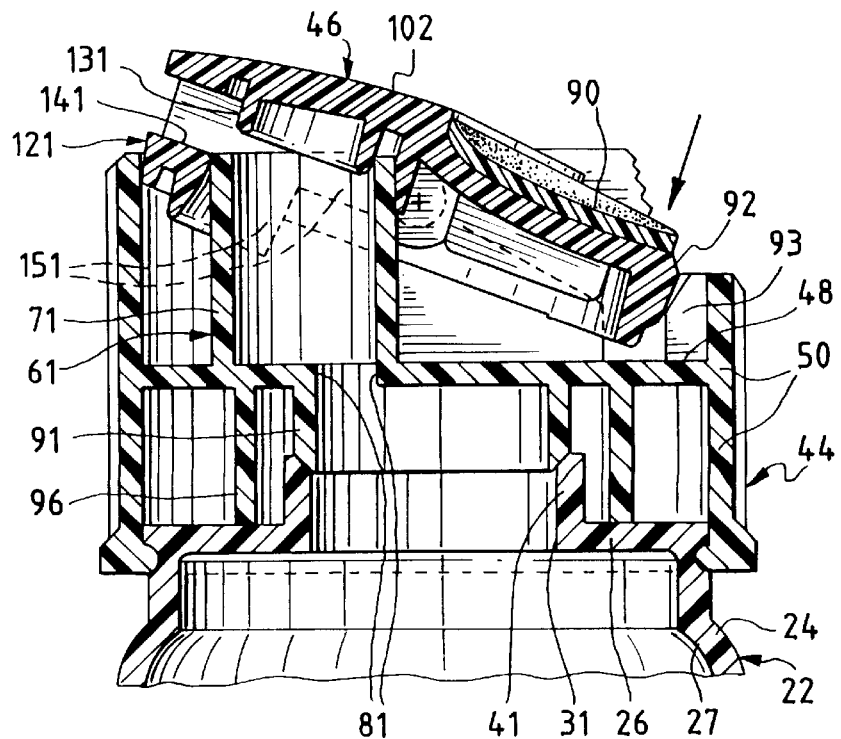
FIG. 5 is a cross-sectional view taken generally along the plane 5—5 in FIG. 2.

The container 22 typically has a body 24 with an end wall 26 (FIGS. 4 and 5). The container 22 may typically be a deformable, collapsible container with an interior storage compartment 27 (FIGS. 4 and 5) which contains a flowable material or product (not visible in the figures) and which is open at the top to define a discharge opening 31 (FIGS. 4 and 5). In the preferred embodiment, the interior storage compartment is defined by the exterior wall 24 of the container 22. The interior compartment could be defined by other structures, such as cylinder/piston mechanisms, collapsible bags, or the like.

The container 22 is preferably injection-molded from a suitable material that permits the container to be at least temporarily squeezed or compressed. The container 22 could also be a blow-molded container. The container may have the form of a tube and may be readily molded from an appropriate synthetic plastic material such as polyvinyl chloride or polyethylene. On the other hand, if a separate, internal storage compartment and/or pressurizing mechanism is employed, then the container 22 may be fabricated from other materials, including, for example, metals such as aluminum, tin, lead, or the like.

The container 22 would typically be a squeezable container having a flexible wall 24 or walls which can be grasped by the user and compressed to increase the internal pressure within the container so as to squeeze the product out of the container through the closure 20 when the closure 20 is opened. The container wall typically has sufficient, inherent resiliency so that when the squeezing forces are removed, the container wall returns to its normal, unstressed shape. Such a structure may be preferred in some applications, but may not be necessary or preferred in other applications.

The container 22 may also be a substantially rigid container having telescoping moving parts which permit one portion of the container to be pushed relative to the other to decrease the interior volume and force the materials from within the container compartment out through the closure 20 when the dispensing closure 20 is opened. Alternatively, other suitable means may be provided for applying pressure to the materials within the compartment inside the container 22 so as to force the material out of the container 22.

So long as the container 22 has a discharge opening 31, the detailed design and operation of other features of the container 22 form no part of the present invention. In the preferred embodiment, the discharge opening 31 is defined by an outlet tube 41 (FIGS. 4 and 5).

Although the container, per se, need not necessarily form a part of the present invention, per se, it will be appreciated that part of the dispensing structure of the present invention may be provided as a unitary portion, or extension, of the top of the container. However, in the preferred embodiments illustrated, the dispensing structure of the present invention is a separate element in the form of a closure 20 which is adapted to be mounted to a previously manufactured container 22 having a discharge opening 31.

Figure 3:
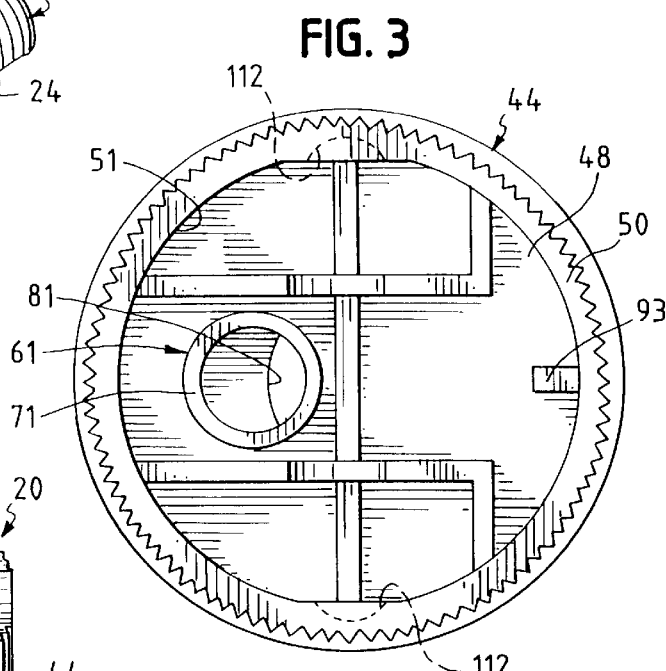
FIG. 3 is a top plan view of the closure body with the actuator removed.
Figure 2:
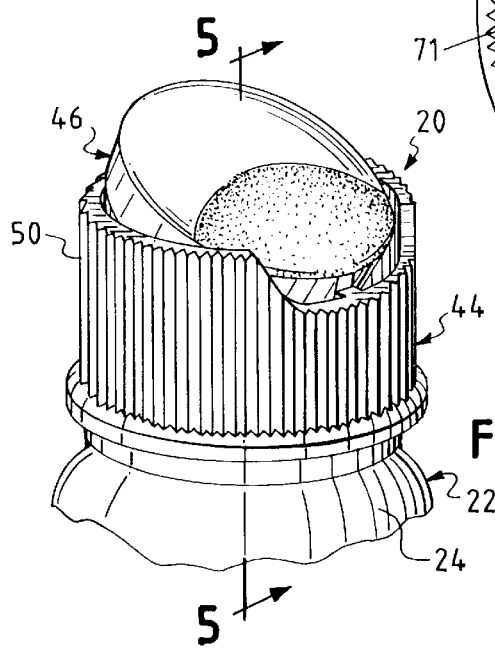
FIG. 2 is a rear, perspective, fragmentary view of the dispensing structure shown with the actuator tilted to the dispensing, open position.

As shown in FIGS. 1 and 2, the closure 20 includes a body 44 and an actuator 46. The body 44 includes a deck 48 (FIGS. 3–5) surrounded by a peripheral wall 50 (FIGS. 1–5). The deck 48 is connected at its periphery to the peripheral wall 50. The peripheral wall 50 extends above the deck 48, as can be seen in FIG. 3, to define a central recess 51. The peripheral wall 50 also extends below the deck 48 as can be seen in FIGS. 4 and 5.

The bottom, inner edge of the peripheral wall 50 defines an inwardly directed, annular bead 52. The bead 52 is used to establish a snap-fit engagement retention of the dispensing structure or closure 20 on the container 22 as shown in FIG. 4. The container body 24 of the container 22 defines an inwardly concave, annular groove 54 below the end wall 26 as shown in FIG. 4. The groove 54 receives the closure annular bead 52 in a snap-fit engagement. Alternatively, a threaded attachment arrangement could be provided.

The closure body 44 defines a discharge conduit 61 in the form of an annular upper tube 62 as illustrated in FIGS. 3, 4, and 5. The discharge conduit 61 projects upwardly from the deck 48 around an aperture 81 and further includes a lower tube 91 projecting downwardly from the deck 48 around the first aperture 81 (FIGS. 4 and 5).

As can be seen in FIGS. 4 and 5, when the closure 20 is mounted to the container 22, the closure body lower tube 91 is received in, and sealingly engages the interior edge of, the container outlet tube 41.

As illustrated in FIGS. 4 and 5, the body lower tube 91 is generally cylindrical and defines an axis. The body upper tube 71 is generally cylindrical and defines an axis. The axis of the body upper tube 71 is offset relative to the axis of the body lower tube 91. In this embodiment, the offset between the upper and lower tubes determines the shape of the aperture 81. The aperture 81 does not define a completely circular opening. Rather, the aperture 81 defines only a partially circular opening.

Preferably, as illustrated in FIGS. 4 and 5, the closure body 44 also includes an interior wall 96. The interior wall 96 depends downwardly from the deck 48 within the peripheral wall 50 around the lower tube 91.

The actuator 46 is a generally disk-like nozzle structure. As shown in FIGS. 6 and 7, the actuator 46 includes a transverse top wall 102, with convex and concave surface regions, and a peripheral flange 104. On the flange 104, there are two, oppositely directed engageable surfaces in the form of generally hemispherical members 108 (FIGS. 6 and 7) with flattened regions.

The closure body peripheral wall 50 defines two spaced-apart engaging surfaces in the form of small, concave recesses 112 (FIG. 3). The small recesses 112 are spaced apart on opposite sides of the central recess 51 defined by the body peripheral wall 50. The engaging surfaces or recesses 112 define a pivot axis extending across a portion of the central recess 51. The actuator members 108 are adapted to be received within the body recesses 112. The body peripheral wall 50 has sufficient flexibility or resiliency to accommodate a slight outward deflection, at least in the regions of the recesses 112, to accommodate insertion of the actuator 46 into the closure body 44 and to facilitate a mating, snap-fit engagement between each of the members 108 and one of the recesses 112. This establishes a pivotal mounting of the actuator 46 in the closure body 44 and accommodates tilting of the actuator 46 between an upwardly angled, dispensing, open position (FIGS. 2 and 5) and a lowered, generally horizontal, non-dispensing, closed position (FIGS. 1 and 4).

The actuator 46 can be pivoted to the upwardly tilted position by pushing downwardly on a concave surface, finger well, or finger pad 90 (FIGS. 4, 5, and 6) which is adapted to receive the end of a thumb or finger. The actuator 46 can be returned to the closed position (FIG. 4) by pushing down on the front part of the actuator 46.

In some applications, it may be desirable to provide the actuator 46 with a rearwardly extending, angled cam 92 for engaging a protuberance 93 the inside of the peripheral wall 50 of the body 24 as the actuator 46 is tilted upwardly (to the position shown in FIG. 5). The rearwardly extending cam 92 slides against the protuberance 93 on the peripheral wall 50 and serves to stabilize the actuator 46 as it is being pivoted. The cam 92 provides a frictional engagement to maintain the actuator in the tilted, open position.

As shown in FIGS. 4 and 5, the actuator 46 has a dispensing conduit 121. The dispensing conduit 121 includes a first sealing member or plug 131 (FIGS. 4, 5, and 7). The dispensing conduit 121 defines an internal dispensing passage 141 which opens to the front of the actuator 46.

The dispensing conduit 121 also includes a stepped, cylindrical, sealing wall 151, as shown in FIG. 4. The sealing wall 151 seals around the outer periphery of the closure body upper tube 71. Even when the actuator 46 is in the tilted, open position as shown in FIG. 5, the sealing wall 151 still seals against the outer surface of the upper tube 71. When the actuator 46 is in the closed position, and when the actuator 46 is in the open position, the upper tube 71 is sealed about its periphery by the cylindrical wall 151.

As illustrated in FIGS. 4, 5, and 7, the sealing plug 131 projects downwardly from the bottom of the actuator top wall 102. The sealing plug 131 has a generally cylindrical or annular configuration and is adapted to enter into the opening at the top of the upper tube 71 to sealingly occlude the tube 71 when the actuator 46 is in the closed position as illustrated in FIG. 4. On the other hand, when the actuator 46 is tilted to the open, dispensing position as illustrated in FIGS. 2 and 5, then the front portion of the sealing plug 131 is tilted away from the upper tube 71 so as to permit flow of material out of the tube and through the dispensing passage 141.

The container 22 can be squeezed, or otherwise operated, to force the material from the internal compartment upwardly through the outlet tube 41 in the end of the container, through the closure body lower tube 91, through the closure body upper tube 71, and out of the open actuator dispensing passage 141. As previously explained, the means by which the material is forced out of the container, and any special construction for facilitating such discharge of material from the container, form no part of the present invention.

The finger pad 90, in the preferred embodiment illustrated, is molded from a rubber-based, thermoplastic elastomer in a concave region behind the convex region of the actuator top wall 102. The remaining portion of the actuator 46 is preferably molded from a thermoplastic material such as polypropylene which is generally substantially rigid after it has been molded. Thus, the finger pad 90, if it is molded from a rubber-based, thermoplastic elastomer, will feel softer compared to the rest of the actuator 46. This will provide a pleasant tactile sensation for the user and can further function to provide greater frictional engagement between the pad 90 and the user's finger. This may be especially helpful when the actuator is incorporated in a closure on a container for a product which is typically used in a shower or bathroom where the user's hands may be wet.

In a preferred form of the actuator 46, the finger pad material is a different color than the color of the material used to form the rest of the actuator. This will more readily distinguish the finger pad region from the rest of the actuator and provide the user with a readily apparent indication that the finger pad region is the region which should be pressed to open the closure.

In the presently preferred form of the closure, the actuator is formed by a molding process of bi-injection, two-shot molding, multi-injection molding, or over-molding. Descriptions of multi-shot, multi-material injection molding techniques are set forth in "Multi-Material Injection Saves Time, While Cutting Costs," MODERN PLASTICS, Mar. 19, 1994 (author: Peter Mapleston), in "Molding Many Parts Into One," Product Design and Development, Dec. 19, 1995, page 16 (author: Jay Rosenberg), and in U.S. Pat. No.

5,439,124. The European Patent No. 0 570 276 discloses how an internal mold element 12 can be repositioned to accommodate the molding of a second material into a ring 8 against a closure body previously molded from a first material.

Preferably, a bi-injection molding process is employed. Specifically, the portion of the actuator which does not include the finger pad 90 is molded as a first piece from a first material, such a polypropylene, in a cavity of a mold assembly or tool. Part of the cavity is blocked with a removable blocking member to prevent the hot, flowable polypropylene from filling portions of the cavity where the finger pad 90 will be subsequently located. The first material is allowed to cool briefly. Subsequently, the blocking member is removed to expose the additional region of the mold cavity. The second material, such as a rubber-based, thermoplastic elastomer, is injected into the remaining vacant region of the cavity. This is allowed to cool to become attached or bonded to the first piece of the actuator with a weld defined by the interface solidification of melted portions of the second and/or first materials. The completed actuator may then be removed from the mold assembly.

The closure body 44 can be separately molded in another mold assembly from a suitable material, which is typically the same material as the material used for the first piece of the actuator (e.g., polypropylene). Then, the closure body 44 and the completed actuator 46 can be assembled together.

If desired, the closure body 44 may be formed as an integral or unitary part of the container 22. In such a design, the particular structure of the closure body 44 can be modified as necessary to be a simple, easily molded portion of the dispensing end of the container 22. This could be readily accomplished by molding the container with the bottom, non-dispensing, end of the container initially open. Subsequently, the open, bottom end of the container would be closed by one of a variety of suitable processes. For example, a separate, bottom end closure could be secured over the open bottom end of the container (after the dispensing actuator is mounted on the dispensing end of the container, and after the product has been introduced into the container). Such a bottom end closure may be threadingly engaged, snap-fit engaged, adhesively secured, welded, or otherwise appropriately attached to the bottom end of the container.

Although the actuator 46 is molded from a first injection of material and from a subsequent second injection of material to form the finger pad 90, the material employed in both the first injection and the second injection could be the same material. Typically, however, the finger pad 90 would contrast with the underlying portion of the actuator 46. This contrast may be effected by simply providing the actuator pad 90 with a different color (even though the pad 90 and underlying portion of the actuator 46 could be molded from the same material). Alternatively, however, the contrast between the finger pad 90 and the underlying portion of the actuator 46 could be provided by using two different materials which may have the same color but which have different surface textures. Various textures may be molded into the upper surface of the finger pad 90. Additionally, the finger pad 90 may be provided with indicia molded directly into the finger pad material, and such indicia may include symbols, words, logos, etc.

The present invention also contemplates that a third material, or even more materials, may be molded with multi-injection processes to form a multi-material actuator. Alternatively, one material may be molded in three or more separate injections to provide a multi-injection molded actuator. Where the same material is employed in two or more injections, the material may have different colors for each of the different injections.

Preferably, as shown in FIG. 8, the rear portion of the top wall 102 of the actuator 46 has a recessed, concave region for receiving the finger pad 90, and the recessed region is defined by a step or wall 180 which has a height substantially equal to the thickness of the pad 90. According to the presently preferred method of making the closure actuator 46, the thickness of the pad 90 is such that the height of the pad 90 is about 0.010 inch less than the height of the recessed region wall 180. This is the result of the molding process which requires a shut-off condition between the actuator 46 and the mold assembly steel (i.e., movable blocking member) which, in its moved position, defines a peripheral portion of the mold cavity for the injection of the pad molding material between the steel and actuator. Thus, there will be a very small "step" from the top of the pad 90 to the slightly higher surface of the adjacent portion of the actuator top 102 at the wall 180.

An alternate embodiment of the dispensing structure of the present invention is illustrated in FIG. 9 which shows an actuator 46A. The actuator 46A has substantially the same structure as the actuator 46 described above with reference to the first embodiment illustrated in FIGS. 1–8 and is adapted to be mounted on an actuator body, such as the body 44 described above with reference to the first embodiment illustrated in FIGS. 1–8. However, in the alternate form of the actuator 46A illustrated in FIG. 9, a finger pad 90A is provided with an upwardly projecting indicia 200. The indicia 200 is shown for purposes of illustration as a generally annular ring. The annular ring is created by the mold assembly steel. In particular, the movable blocking member steel (which initially defines the surface of the actuator recessed region (for receiving the finger pad) when the actuator is first molded) defines an annular groove facing into the actuator mold cavity. This fills with the flowable first mold material, when the actuator 46A is molded, to form an upwardly projecting annular ring 210. After the actuator 46A is molded, the blocking member steel is withdrawn to the second position to define the mold cavity for the finger pad 90A. Then, the material for molding the finger pad 90A is injected as a flowable material on the previously molded, underlying portion of the actuator. The finger pad material also flows into the annular groove in the blocking member steel to form the indicia 200. The indicia 200 may have other configurations, such as a logo, a letter or word, a symbol, etc.

It will be readily observed from the foregoing detailed description of the invention and from the illustrations thereof that numerous other variations and modifications may be effected without departing from the true spirit and scope of the novel concepts or principles of this invention.

What is claimed is:

1. A toggle-action dispensing structure for an opening to a container, said structure comprising:

a body for extending from said container around said opening and defining a discharge aperture communicating with said opening; and an actuator which defines a pivot axis and which is pivotally mounted on said body for occluding flow from said container through said discharge aperture when said actuator is in a closed, non-dispensing position and for permitting flow from said container when force is applied to said actuator to tilt said actuator to an open, dispensing position;

said actuator including a first, generally rigid piece which is molded in an initial injection molding step from a material and which defines a force-receiving region on one side of said pivot axis; and said actuator including a second piece which is injection molded in situ in a subsequent injection molding step from a material onto said first, rigid piece force-receiving region so as to become bonded to said first, rigid piece to define a finger pad against which a finger may be pressed to tilt said actuator to said open, dispensing position.

2. The dispensing structure in accordance with claim 1 in which said first, rigid piece is molded from a thermoplastic material; and said second piece is molded from a rubber-based, thermoplastic elastomer.

3. The dispensing structure in accordance with claim 1 in which said first, rigid piece and said second piece are molded from the same material; and said second piece has a color which differs from the color of said first, rigid piece.

4. The dispensing structure in accordance with claim 1 in which said second piece includes indicia molded into the surface of said second piece.

5. The dispensing structure in accordance with claim 1 in which said dispensing structure body is separate from said container and includes an inwardly extending bead for engaging a mating groove in the container in a snap-fit arrangement.

6. A toggle-action dispensing structure for an opening to a container, said structure comprising:

a body for extending from said container around said opening and defining a discharge aperture communicating with said opening; and an actuator which defines a pivot axis and which is pivotally mounted on said body for occluding flow from said container through said discharge aperture when said actuator is in a closed, non-dispensing position and for permitting flow from said container when force is applied to said actuator to tilt said actuator to an open, dispensing position;

said actuator including a first, generally rigid piece which is molded from a material and which defines a force-receiving region on one side of said pivot axis; and said actuator including a second piece which is molded from a material onto said first, rigid piece force-receiving region and bonded to said first, rigid piece to define a finger pad against which a finger may be pressed to tilt said actuator to said open, dispensing position, and wherein said actuator includes a third piece molded onto said second piece;

at least part of said second piece is exposed adjacent said third piece; and said third piece contrasts with said second piece.

7. The dispensing structure in accordance with claim 6 in which said second piece and said third piece each have a different color to establish a color contrast between said second piece and said third piece.

* * * * *